Patented July 12, 1949

2,475,852

UNITED STATES PATENT OFFICE 2,475,852

MORPHOLINOALKANOL ESTERS

Elmore Hathaway Northey and Martin Everett Hultquist, Bound Brook, N. J., assignors to American Cyanamid Company, New York, N. Y., a corporation of Maine No Drawing. Application April 8, 1942, Serial No. 438,114

2 Claims. (Cl. 260—247)

This invention relates to morpholinoalkanol esters of carbocyclic substituted aliphatic carboxylic acids.

Alkamine esters of carbocyclic substituted carboxylic acids are of very considerable commercial importance particularly with respect to the monobasic and dibasic aliphatic acids. The exact properties and consequently the uses to which they may be put depend upon the particular acid and the particular aminoalcohol which go to make up the ester. The morpholinoalkanol esters of the carbocyclic substituted carboxylic acids with which the present invention is concerned are variously useful as mydriatics, local anesthetics and anti-spasmodics.

The compounds of the present invention may be represented by the type formula (M—Al)$_x$—Ac in which M is a morpholine radical, Al is an alcohol residue attached to the morpholine ring at the nitrogen atom, Ac is a carbocyclic-substituted aliphatic acyl group and $x$ is a small whole number. M may be the morpholine ring itself or a substituted morpholine such as 3,5-dimethyl morpholine, 5-ethyl morpholine and the like. Al may be the residue of a saturated or unsaturated alcohol. Ac may be any diaryl, di-alicyclic or aryl-alicyclic substituted monobasic or polybasic aliphatic acyl group. Typical of the acids with the esters of which the present case is concerned are the arylcyclohexylacetic, diarylpropionic, diarylsuccinic, dicyclohexylacetic acids and the like, dicyclohexylglycollic, tolilic, anisilic, naphthilic acids and the like. Another typical acid type, with the esters of which the present invention may be concerned, is the hydroxy acids such as benzilic and the like. These latter esters form the subject matter of our divisional-application Ser. No. 71,762, filed Jan. 19, 1949.

These esters in general are oily viscous liquids insoluble in water and soluble in alcohol, acetone and benzene. In general they may be distilled at fairly high temperatures under high vacuum. They are usually more conveniently handled in the form of their salts which may be easily prepared since the esters themselves are slightly basic in reaction. The hydrochlorides, for example, are in general white crystalline salts, generally soluble in water and acetone and generally insoluble in ether. Other salts such as the nitrate, sulfate, hydrobromide, citrate, tartrate and the like may be readily prepared if so desired. Quaternary compounds such as the methiodide, ethobromide and the like may also be readily prepared. These quaternary compounds may be readily prepared by treating the base in an alcohol solution with a compound such as methyl iiodide or ethyl bromide and precipitating the salt.

Many of the salts, particularly the hydrochlorides, when in aqueous solution are suitable for use as therapeutics. Many of them are characterized by an extremely low toxicity as compared with naturally occurring substances such as cocaine or papaverine or with the dialkylaminoalkanol esters of the same acids. For example, in a test on mice injected intra-peritoneally, cocaine gave an MLD$^{50}$ toxicity of about 90 mg. per gram and diethylaminoethyl diphenylacetate about 300 mg. per gram whereas the morpholinoethanol diphenylacetate has the extraordinarily high value of 625 mg. per gram. This lower toxicity is a particular advantage in that it applies whether the material is being used as a surface therapeutic in the case of mydriatic use, is taken internally, for example as an anti-spasmodic, or is injected sub-cutaneously as a local anesthetic. This property, therefore, is of special value since the toxic character of naturally occurring compounds used for these purposes was one of the main reasons leading to the extensive research carried out in attempting to find a satisfactory substitute.

The present invention will be more fully illustrated in connection with the following examples which are illustrative and not by way of limitation. All parts are by weight unless otherwise noted.

Example 1

Morpholinoethyl β,β-diphenylpropionate hydrochloride

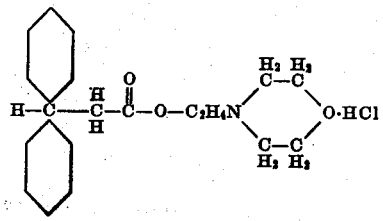

40 parts of β,β-diphenyl propionic acid and 80 parts of thionyl chloride were mixed and gently refluxed for ¾ of an hour after which the excess thionyl chloride was distilled off. The residue was dissolved in 400 parts of anhydrous ether and 40 parts of β-morpholino ethanol added thereto while the mixture was stirred and gently heated. The mixture was then refluxed for 2 hours, cooled to 10° C. and filtered. The filtrate was extracted several times with dilute hydrochloric acid. The extracts were combined and made alkaline with sodium carbonate which precipitated the ester base as an oily liquid. The oily liquid was taken up in ether and dried over anhydrous sodium sulfate. The ether was distilled off at atmospheric pressure and the residue distilled at 3 mm. pressure at 180–185° C. The ester base was taken up in anhydrous ether and hydrogen chloride gas bubbled through until precipitation stopped. The precipitate was collected and recrystallized from acetone.

Example 2

Morpholinoethyl α,α-di(aminotolyl) propionate hydrochloride

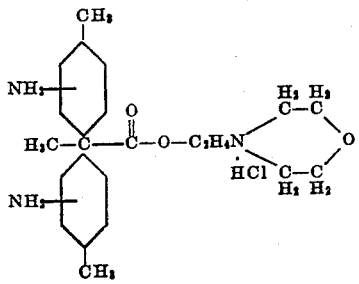

24 parts of α,α-di-(nitrotolyl) propionyl chloride were dissolved in 35 parts of benzene and 17½ parts of N-ethanol morpholine added thereto. The mixture was refluxed for 30 minutes, cooled to 20° C. and the precipitated N-ethanol morpholine hydrochloride removed by filtration. The benzene was distilled from the filtrate and the residue taken up in 15 parts of xylene. To the xylene extract were added 40 parts of iron filings, 10 parts of glacial acetic acid and 40 parts of water and the mixture refluxed for about 2 hours at 92° C. The mixture was filtered, the iron filings washed with xylene and the washings combined with the filtrate and evaporated to dryness. The residue, a very viscous yellow liquid, was then dissolved in 75 parts of acetone and 4½ parts of concentrated hydrochloric acid added thereto. A gummy mass separated out which crystallized on stirring with anhydrous ether.

Example 3

Morpholinopropyl diphenylacetate

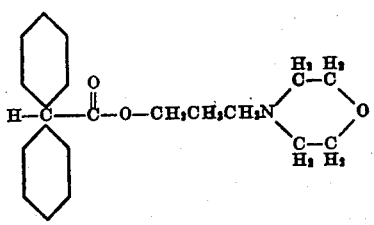

46 parts of diphenylacetyl chloride were dissolved in 100 parts of benzene, heated to a temperature of reflux and 58 parts of N-n-propanol morpholine were slowly added and the mixture refluxed for 1 additional hour, after which the solution was cooled to about 10° C. and the N-n-propanol morpholine hydrochloride which precipitated during the reaction was filtered out and the filtrate distilled under reduced pressure to remove residual benzene. The residue, a slightly yellowish tinged, viscous oil, was morpholinopropyl diphenylacetate.

Example 4

Morpholinocyclohexyl diphenylacetate

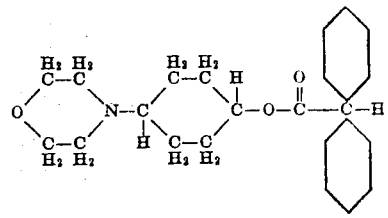

To a solution of 46 parts of diphenylacetyl chloride in 100 parts of benzene which was boiling under reflux was added 74 parts of morpholinocyclohexanol over a period of about 30 minutes. After refluxing for 1 hour more the solution was cooled to room temperature, the precipitated N-cyclohexanol morpholine hydrochloride was removed by filtration and the solution distilled to remove the residual benzene. The amber colored residue was morpholinocyclohexyl diphenylacetate.

Example 5

Morpholinoethyl dicyclohexylacetate

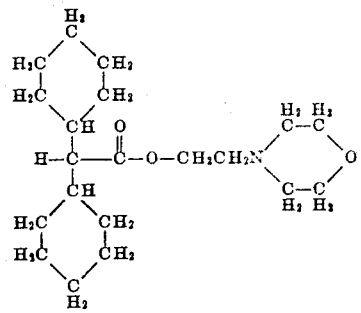

50 parts of dicyclohexylacetyl chloride were dissolved in 100 parts of benzene, heated to a temperature of reflux and 52 parts of N-ethanol morpholine were slowly added and the mixture refluxed for 1 additional hour, after which the solution was cooled to about 10° C. and the N-ethanol morpholine hydrochloride which precipitated during the reaction was filtered out and the filtrate distilled under reduced pressure to remove residual benzene. The residue, a slightly yellowish tinged, viscous oil, upon analysis was morpholinoethyl dicyclohexylacetate.

Example 6

β-N-morpholinoethyl dinaphthylacetate

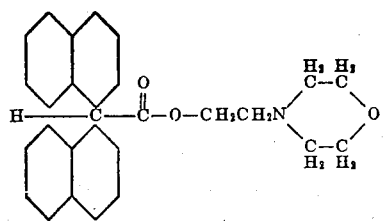

To a solution of 66 parts of dinaphthylacetyl chloride in 100 parts of benzene which was boiling under reflux was added 52 parts of morpholinoethanol over a period of about 30 minutes. After refluxing for 1 hour more the solution was cooled to room temperature, the precipitated N-ethanol morpholine hydrochloride was removed by filtration and the solution distilled to remove the residual benzene. The amber colored residue was the β-N-morpholinoethyl dinaphthylacetate.

While the preceding examples have been made by the reaction of an acid chloride and a morpholinoalkanol, the invention is not so limited. In the case of hydroxyacids such as benzilic or dibasic acids such as symmetrical diphenylsuccinic acid, the acid chloride can not be prepared. Accordingly, the esters may be best formed by some type of alcoholysis. Any type of alcoholysis reaction may be used but our preferred form is to first form a simple alkyl ester of the acid and then carry out a catalyzed ester interchange according to the process of Hill and Holmes application Serial No. 431,822 filed February 21, 1942, now Patent No. 2,394,770. Preferably the alcohol which is replaced by the aminoalcohol is continuously removed as it is formed. This procedure will be illustrated by the following examples.

*Example 7*

β-morpholinoethyl benzilate

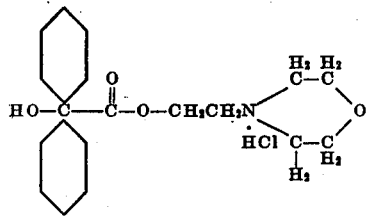

115 parts of ethyl benzilate, 150 parts β-4-morpholinoethanol and 0.2 part of metallic sodium were placed in a flask attached to a total-reflux variable take-off fractionating column. The pressure was reduced to 100 mm. and heat was applied by an oil bath the temperature of which was slowly raised to 90° C. During three hours of heating 17 parts of ethanol distilled (35.5° C.). When the distillation of the ethanol became slow, the bath temperature was raised to 120° C. When the vapor temperature indicated distillation of the aminoalcohol the take-off valve was closed and the mixture was refluxed for one hour. At the end of this period the vapor temperature had dropped and two more parts of ethanol were distilled. The remaining aminoalcohol was slowly distilled for three hours. The pressure was then reduced to 20 mm. and the remainder of the aminoalcohol distilled at 66° C. During the reaction the color of the solution changed from yellow to deep red. The residue was dissolved in 500 parts of ether, washed once with dilute brine, and three times with water, dried over sodium sulfate and finally dried over calcium sulfate. 500 parts of a saturated solution of HCl in absolute ether was added and the resulting precipitate filtered. Dry HCl gas was passed into the filtrate to a slight excess and the precipate again filtered. The combined precipitates were washed with cold acetone. The product when purified by recrystallization from acetone as fine white crystals melted at 182–183° C.

*Example 8*

Di-(β-morpholinoethyl) symmetrical diphenyl succinate hydrochloride

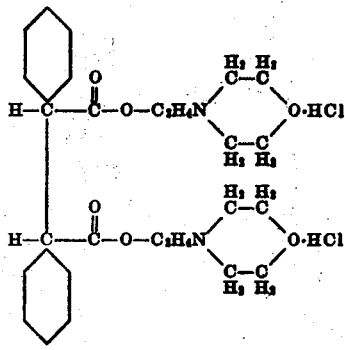

To a solution of 2 parts of sodium in 300 parts of β-morpholinoethanol was added 260 parts of a mixed meso and racemic ethyl ester of diphenylsuccinic acid. The mixture was heated on an oil bath at 145° C. for 48 hours. The excess β-morpholinoethanol was distilled off and the residue extracted with dilute hydrochloric acid. The acid extract was washed twice with ether and sodium carbonate until a precipitate formed. The precipitate was filtered out, extracted with ether, the extract added to the filtrate and the combination dried over anhydrous sodium sulfate. The residue was again filtered and the residual ether distilled off at atmospheric pressure. The pressure was reduced to 5 mm. and the fraction distilling from 220–235° C. was collected. The oily ester base was dissolved in dry ether and dry hydrogen chloride gas bubbled therethrough until precipitation stopped. Ether was decanted and the gummy residue again treated with dry ether and the ether removed. The residue was treated with acetone, a part being soluble and a part forming a flocculent precipitate. The mixture was cooled, the precipitate filtered off, washed with acetone and ether and dried in a vacuum desiccator. The product is a white friable amorphous powder soluble in water and alcohol but insoluble in acetone and ether.

We claim:

1. A chemical compound selected from the group consisting of the esters having the formula

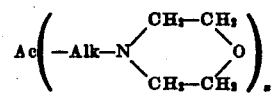

and the water-soluble salts of such esters, in which Ac is the residue of a dicarbocyclic-substituted carboxylic acid containing 14–16 carbon atoms and selected from the group consisting of the diphenylpropionic, dicyclohexylacetic and diphenylsuccinic acids; Alk is a hydrocarbon residue selected from the group consisting of the —CH₂—CH₂—, —CH₂—CH₂—CH₂— and

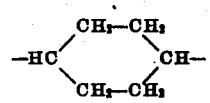

radicals and $x$ is a small whole number selected from the group consisting of 1 and 2, $x$ being 2 only when Ac is the residue of diphenylsuccinic acid.

2. A chemical compound selected from the group consisting of di(N-morpholinoethyl) diphenylsuccinate of the formula

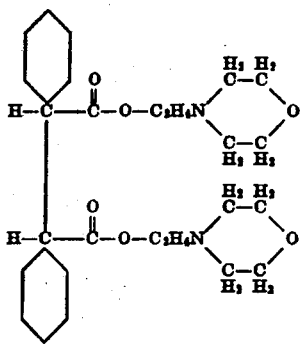

and its water-soluble salts.

ELMORE HATHAWAY NORTHEY.
MARTIN EVERETT HULTQUIST.

REFERENCES CITED

The following references are of record in the file of this patent:

UNITED STATES PATENTS

| Number | Name | Date |
|---|---|---|
| 2,079,962 | Miescher | May 11, 1937 |
| 2,129,805 | Wilson | Sept. 13, 1938 |
| 2,246,264 | Pinkernelle | June 17, 1941 |
| 2,249,518 | Dickey et al. | July 15, 1941 |

FOREIGN PATENTS

| Number | Country | Date |
|---|---|---|
| 655,404 | Germany | Jan. 14, 1938 |
| 656,784 | Germany | Feb. 15, 1938 |
| 657,526 | Germany | Mar. 7, 1938 |

OTHER REFERENCES

J. Pharmacology, vol. 74, pages 290–308.
J. Amer. Chem. Soc., vol. 64, pages 970–973.
J. Amer. Pharmaceutical Assn., vol. 31, pages 57–59.
J. Amer. Chem. Soc., vol. 55, pages 365–370.